United States Patent [19]

Vernot et al.

[11] 3,747,066

[45] July 17, 1973

[54] OPTICAL SCANNER AND SIGNAL PROCESSING SYSTEM

[75] Inventors: Ralph T. Vernot, Philadelphia; Jimmie Neill, Hatloro, both of Pa.

[73] Assignee: OCR Systems, Inc., Horsham, Pa.

[22] Filed: Aug. 23, 1971

[21] Appl. No.: 173,822

[52] U.S. Cl. ................. 340/146.3 AG, 250/219 CR

[51] Int. Cl. .............................................. G06k 9/12

[58] Field of Search ................................ 340/146.3; 250/219 CR

[56] References Cited

UNITED STATES PATENTS

| | | | |
|---|---|---|---|
| 3,496,541 | 2/1970 | Haxby et al. | 340/146.3 AG |
| 3,484,747 | 12/1969 | Nunley | 340/146.3 AG |
| 3,568,151 | 3/1971 | Majima | 340/146.3 AB |

OTHER PUBLICATIONS

Villante, IBM Technical Disc. Bulletin, "Automatic Threshold Control Circuit," Vol. 5, No. 6, Nov. 1962, pp. 55 & 56.

*Primary Examiner*—Thomas A. Robinson
*Assistant Examiner*—Leo H. Boudreau
*Attorney*—Smith, Harding, Earley & Follmer

[57] ABSTRACT

The reflectance of each small area on a document being scanned by a photosensitive device in an array of photosensitive devices is compared with the reflectance of a larger surrounding region in order to generate a video signal for identifying the parts of a printed character or other pattern, which minimizes the effects of variations in document reflectance, variations in incident light intensity and noise.

8 Claims, 10 Drawing Figures

INVENTORS
RALPH T. VERNOT &
JIMMIE NEILL
BY
Smith Harding Earley & Follmer
ATTORNEYS INVENTORS
RALPH T. VERNOT &
JIMMIE NEILL
BY
Smith Harding Earley & Follmer
ATTORNEYS INVENTORS
RALPH T. VERNOT &
JIMMIE NEILL
BY
Smith Harding Earley & Follmer
ATTORNEYS INVENTORS
RALPH T. VERNOT &
JIMMIE NEILL
BY
Smith Harding Earley & Follmer
ATTORNEYS

OPTICAL SCANNER AND SIGNAL PROCESSING SYSTEM

BRIEF SUMMARY OF THE INVENTION

This invention relates to optical pattern recognition systems and particularly to an optical scanner and signal processing system for use therein. While the invention is considered useful for scanning patterns of various kinds, its principal utility is in the scanning of printed characters. Accordingly, the description will refer to a character recognition system including an optical scanner adapted to scan printed matter on a document, and a system for processing the signals produced by the scanner.

The typical optical character recognition system utilizes an array comprising a row of photocells, and optical means for projecting an image from a document onto the array in such a way that the image of a character printed on the document travels across the row of photocells as the document moves relative to the photocells. The output of each photocell is "quantized," that is, a decision is made electrically as to whether or not the particular area being sensed is black or white, by comparison of the photocell output with a standard. As the document moves, the quantized photocell outputs are fed into a shift register having a capacity sufficient to store temporarily all of the information gathered from a character. After the shift register is filled, the register contents are correlated with known characters, usually by electronic comparison using a resistor matrix. A decision is made first as to whether or not to recognize a character and secondly as to which character of the known characters provides the best match for the register contents.

The foregoing is a description of a typical character recognition system. For a more detailed description of a typical character recognition system, reference should be made to U.S. Pat. No. 3,104,369, issued Sept. 17, 1963 to Rabinow et al.

In the typical recognition system, certain difficulties arise which interfere with the proper identification of characters.

First, variations in the intensity of the incident light used for projection of the character's image onto the photosensitive array constitute a source of error. Spatial variations in light intensity may result from imperfections in the optical system or possibly from ambient light. Time variations may occur as well, resulting from changes in line voltage or changes in ambient light.

A second problem is that of variations in document reflectance which may exist along the path in the document scanned by a particular photocell. The problem is one of setting the "quantizing level," the level which a photocell output must reach for the system to regard the part of the image received by the photocell as corresponding to part of a character. Assuming that the characters are dark on a light background, that is that the characters are less reflective than the character-bearing medium or document, if the quantizing level is set to detect very dark characters on a dark background, then the system will not be able to perceive comparatively light characters on a light background even though the contrast may be great.

A third problem is that of noise. Various sources of noise, i.e., dirt and shives on the document, in the vicinity of the characters, introduce a possibility of erroneous identification because they require the quantizing level to be set so that sources of noise are not recognized as parts of characters. At such settings, it is likely that parts of characters will be missed by the scanning apparatus.

The principal object of this invention is to provide an optical scanner and signal processing system in which the effects of light intensity variations, variations in document reflectance and noise are minimized.

In short, this is accomplished by providing, for each light-sensitive device in the scanning array, background sensing means for sensing the reflectivity of a region in the vicinity, and preferably surrounding, the light-sensitive device. It is this sensing means which determines the quantizing level for its associated photosensitive device in the array. In this way, a comparison is made between the reflectance of the document background and the reflectance of the character. Thus, the apparatus is sensitive to contrast rather than to absolute reflectance. An explanation in the following detailed description with reference to FIGS. 4 and 5 will explain more clearly how this system reduces the effects of light intensity variations, document reflectance variations, and noise.

Preferably, each sensing device in the background sensing means serves more than one light sensitive device in the scanning array. This simplifies the apparatus considerably.

Where the number of light-sensitive devices in the scanning array exceeds the number of sensing devices in the background sensing means, the outputs of several background sensing devices are preferably combined to provide a signal corresponding to the background level for each device in the array. For example, for a given device in the array, the background signal might be derived from three background detectors. Weighting circuitry gives more emphasis to the background area nearest the area viewed by the particular photosensitive device being served.

Accordingly, further objects of the invention are to provide simplified background sensing apparatus and to provide weighting circuitry to provide a background signal for each photosensitive device which closely approaches the background level for that device which would be derived if each device in the array had its own background sensing device.

As a further refinement, weighting circuitry is provided for giving emphasis to the brightest of several backgrounds being viewed for a given photosensitive device. This refinement provides assurance against failure of the signal processing system resulting from the scanning of a comparatively large dark area such as the intersection of an X by the background sensing means.

DETAILED DESCRIPTION

Figures 1, 2:
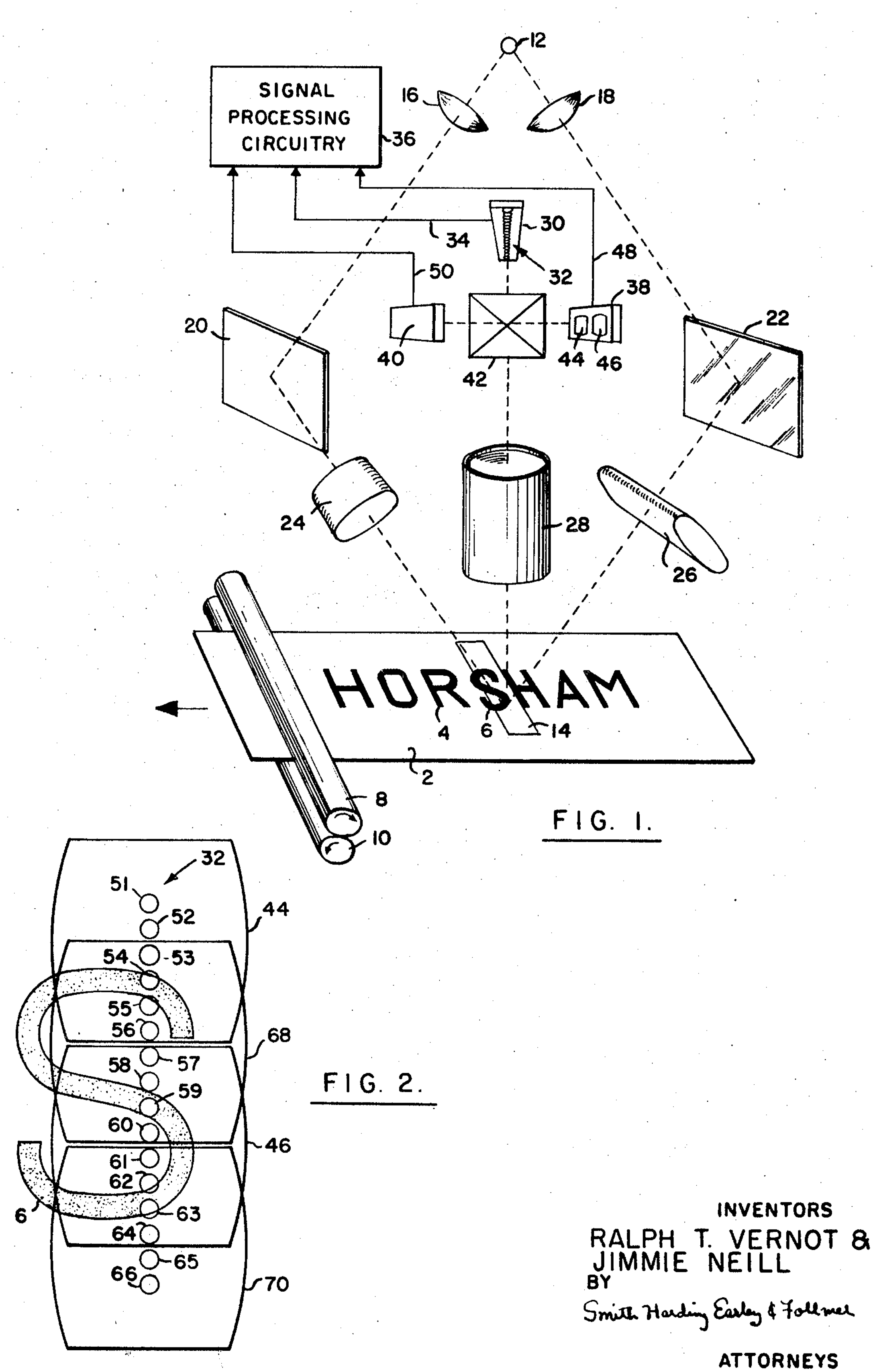
FIG. 1 is a diagrammatic view of a first embodiment of the optical scanner and signal processing system in accordance with the invention.
FIG. 2 is a diagram showing the image of a photodiode array and a background detector array reflected back to a document in order to indicate the areas of the document being viewed by the array and by the background detectors.

FIG. 1 shows a document or character-bearing medium 2 having printed characters 4 and 6 as well as others arranged in a line to form a word. Rollers 8 and 10 move the document in the direction of the arrow and in the direction of the line of print.

A source of illumination is indicated at 12. A quartz-iodide-tungsten lamp is preferably used because of the high intensity which such lamps are capable of producing.

The illuminated portion of the document is indicated at 14. It is preferably rectangular and preferably at least three times the height of the character.

The optical system for illuminating the document from source 12 includes aspheric condensing lenses 16 and 18, mirrors 20 and 22, and cylindrical condensing lenses 24 and 26. The lenses are so arranged that the image of the light source is slightly out of focus on the document. This defocusing, together with the duplication of the projecting systems, insures substantially uniform illumination throughout illuminated portion 14 and a low ripple level.

A lens system 28 is arranged to focus an image of at least a part of the illuminated area on the document onto a scanning device 30 which comprises an array 32 of photocells preferably photodiodes or phototransistors, although other photosensitive devices can be used. Array 32 is shown as comprising 16 photodiodes arranged in a row. In actual practice, the number of photodiodes is greater, typically about 48, in order to achieve good resolution. A smaller number was chosen merely for the purpose of illustration. The row of photodiodes is arranged transverse to the direction of movement of the image as the document is moved by rollers 8 and 10. The length of the row is preferably such that the image of a character is only about one-third of the height of the row, and centered thereon. A character which is out of registration with the line, thus, will ordinarily be picked up by the array, and correction can be achieved electronically in the circuitry responsive to the output of the optical scanner and signal processing system. See, for example, U.S. Pat. No. 3,173,126, issued Mar. 9, 1965, to Rabinow, et al.

The electrical output 34 of the photosensitive array 32 is delivered to signal processing circuitry indicated at 36. The signal processing circuitry provides an output for transmission to conventional recognition circuitry such as described more fully in U.S. Pat. No. 3,104,369. It includes special circuitry the purpose of which is to minimize the effects of variations in document reflectance, variations in incident light intensity and noise.

The same image which is projected onto the photodiode array by lens system 28 is also projected onto elements 38 and 40 by means of a beam splitter 42. Element 38 includes a pair of photosensitive devices 44 and 46, for example, photodiodes, and element 40 is similarly equipped with a pair of photosensitive devices. Outputs from all four photosensitive devices in elements 38 and 40 are delivered to the signal processing circuitry as indicated by lines 48 and 50.

The relative alignment of the photosensitive devices in array 32, element 38 and element 40 will be best understood by reference to FIG. 2, which shows the various photosensitive devices as reflected back onto the document 2, and therefore shows the part of the document which is viewed by each of the photosensitive devices.

As indicated in FIG. 2, photosensitive array 32 comprises 16 photodiodes numbered 51 through 66 inclusive. Photosensitive devices 44 and 46 (of element 38) are arranged next to each other and photosensitive devices 68 and 70 (of element 40) are also next to each other. The area viewed by device 68 overlaps the area viewed by devices 44 and 46 in a symmetrical manner, and the area viewed by device 46 overlaps the areas viewed by devices 68 and 70 also in a symmetrical manner. Device 44 is symmetrical about the group of photosensitive devices 51 through 54. Device 68 is symmetrical about the group of photosensitive devices 55 through 58. Device 46 is symmetrical about the group of photosensitive devices 59–62. Device 70 is symmetrical about the group of photosensitive devices 63–66. Thus, each of devices 44, 46, 68 and 70 in the background sensing array is associated with four of the photosensitive devices in array 32 and covers a region of the document which is in the vicinity of, surrounds, and is larger than any one of the photosensitive devices in array 32 with which it is associated. The width of the background array in the direction of document movement is preferably several times as wide as any expected vertical character stroke. The height of each photosensitive device in the background array is preferably several times the width of any expected horizontal character stroke. The photosensitive devices in array 32, however, are preferably smaller in height and width than the width of a narrow character stroke.

Figure 3:
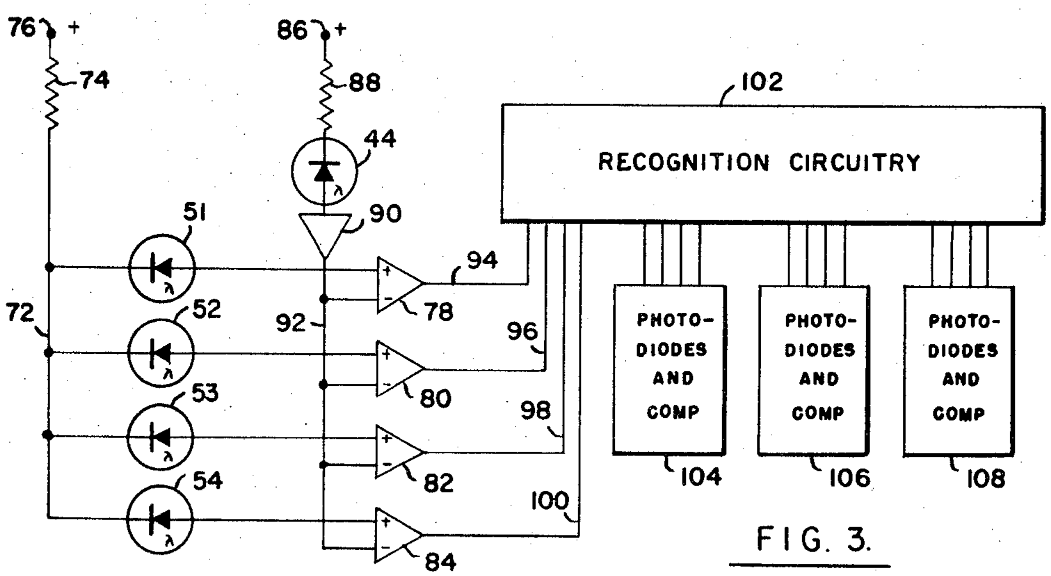
FIG. 3 is a schematic diagram of electrical circuitry associated with the scanning array of FIGS. 1 and 2.

FIG. 3 shows the electrical circuitry which interconnects the background sensing array with array 32.

The cathode of photodiodes 51, 52, 53, and 54 are all connected to line 72 which is connected through resistor 74 to a positive terminal 76. The anode of each of these photodiodes is connected to an input of a differential amplifier which acts as a comparator, producing a large swing in the voltage at its output when one of its inputs passes through the value of the other input.

Photodiode 51 is connected to differential amplifier 78, and differential amplifiers 80, 82, and 84 are provided respectively for the remaining photodiodes 52, 53, and 54 in the group of four photodiodes.

Background detecting photodiode 44 is supplied from positive terminal 86 through resistor 88, and its output is delivered through amplifier 90 to line 92. Line 92 is connected to the inverting input of each of the differential amplifiers of the group.

The outputs of the differential amplifiers are delivered through lines 94, 96, 98 and 100 to the recognition circuitry 102, which ultimately provides a coded output corresponding to the character scanned and stored in the register.

The three remaining groups of four photodiodes with their associated background detectors and comparators are indicated as blocks 104, 106 and 108.

Figure 4:
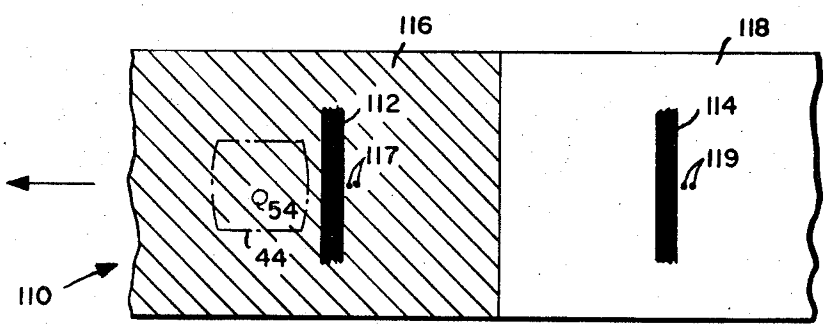
FIG. 4 is a plan view of a portion of a document having a varying background reflectance and having sources of noise.
Figure 5:
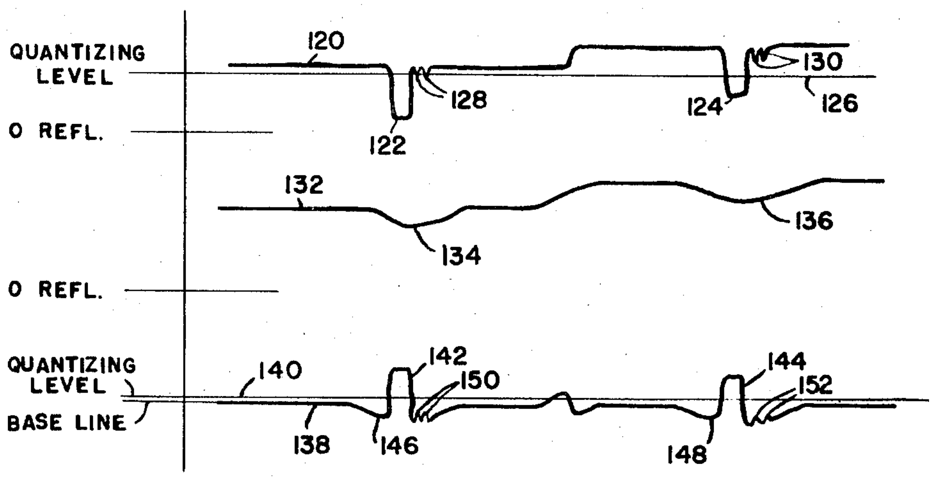
FIG. 5 is a plot of electrical responses of various parts of the scanning apparatus when scanning the portion of the document shown in FIG. 4.

FIGS. 4 and 5, taken together, illustrate the operation of the apparatus just described.

FIG. 4 shows a strip of paper 110 having marks 112 and 114. Assume that mark 112 has a reflectance of 30 percent, and that mark 114 has a reflectance of 50 percent; that is, mark 112 appears darker than mark 114. Further assume that the background area 116 on which mark 112 appears is relatively dark, having a reflectance of 60 percent, while the background area 118 on which mark 114 appears has a reflectance of 80 percent.

44 indicates the area of the document viewed by background detector 44, and 54 indicates the area viewed by photodiode 54. It is the output of photodiode 54 in comparison with the output of background detector 44 which is of interest here, although it will be understood that a similar situation will prevail with regard to each of the photodiodes in array 32 considered together with its associated background detector. Particles of dirt are shown at 117 and 119.

Trace 120 in FIG. 5 is the magnitude of the electrical output of photodiode 54 as strip 110 is moved past it. Downward pulse 122 corresponds to mark 112, and pulse 124 corresponds to mark 114. In this trace, the amplitude is directly proportional to the reflectance. Thus, pulse 122 is the same distance below its background as pulse 124 is below its background.

Line 126 indicates the quantizing level which would be used if the photodiode 54 were not aided by a background detector in accordance with the invention. If line 126 were slightly higher, the apparatus would be unable to distinguish mark 112 from background 116. If level 126 were only slightly lower, the apparatus would not respond to mark 114. Thus it becomes obvious that, the character and background reflectances given as examples in FIG. 4, represent limits upon the capabilities of a conventional scanning apparatus. Background 116 cannot be very much darker, and mark 114 cannot be very much lighter, with the quantizing level set as indicated. A resetting of the quantizing level in an attempt to accommodate backgrounds darker than 116 prevents the conventional apparatus from responding to marks having the reflectance of 114. Likewise, a resetting of the quantizing level to accommodate character strokes lighter than 114 would prevent the conventional apparatus from responding to any characters strokes on a background as dark as 116.

Dirt particles 117 and 119 represent noise which is manifested in the form of small pulses 128 and 130. In trace 120, it will be observed that noise pulses 128 fall below level 126 and therefore will produce a response in the recognition circuitry. It is not practical to avoid this kind of noise by using a lower quantizing level, because this would prevent the circuitry from responding to pulses at the level of pulse 124.

Variations in incident light intensity, for example, variations produced by changes in line voltage supplying the light source, will change the level of trace 120 without producing a corresponding change in the quantizing level. Accordingly, marks which may be identified at one time by the apparatus may not be identified at another time, either because of a light intensity reduction causing the background to fall below the quantizing level, or because of a light intensity increase preventing peaks from the highly reflective strokes from reaching the quantizing level.

FIG. 5 shows the electrical output of background detector 44 as trace 132. Trace 132 is a trace of the background. Since marks 112 and 114 are part of the background, gradual dips appear at 134 and 136.

In FIG. 5, trace 138 represents trace 120 subtracted from trace 132. A quantizing level is indicated at 140, and this represents the amount by which the output of photodiode 54 must exceed the output of its corresponding background detector 44 for a response to be produced and delivered by differential amplifier 84 (FIG. 3) to recognition circuitry 102.

In trace 138, peak 142 corresponds to mark 112 and peak 144 corresponds to mark 114. These peaks rise from backgrounds respectively at 146 and 148. The backgrounds are approximately at the same level and the peaks rise to approximately the same level, and well above the quantizing level 140. From trace 138, it will be understood that, using the system in accordance with the invention, the apparatus would readily recognize mark 114 even if it were much lighter, and would recognize mark 112 even if background 116 were much darker. Thus, the invention extends the capabilities of the scanning device by comparing the reflectance of a character stroke with the reflectance of its background rather than with an absolute standard.

Noise pulses 150, corresponding to dirt particles 117, are located in a valley well below the quantizing level, as are noise pulses 152.

Variations in incident light intensity do not affect the operation of the apparatus, since the comparison is between the reflectances of two areas illuminated by the same source.

Figure 7:
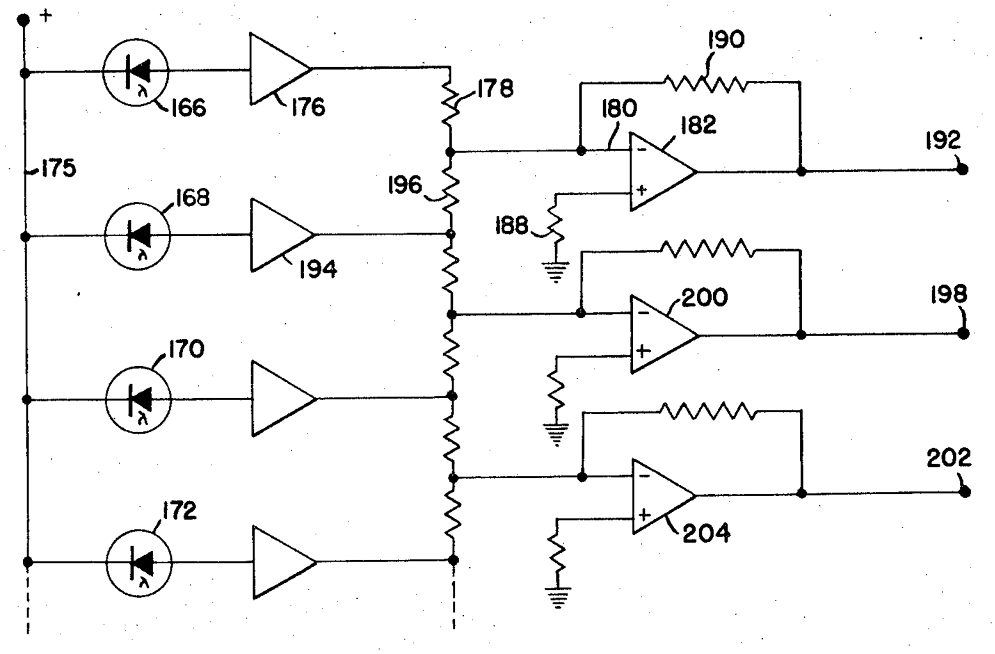
FIG. 7 is a schematic diagram of a summation network for use in conjunction with the scanning apparatus corresponding to FIG. 6.
Figure 6:
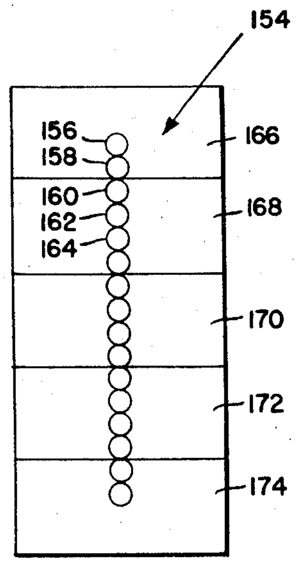
FIG. 6 is a diagram, similar to FIG. 2, showing an alternative array of photodiodes and background detectors in accordance with the invention.

While double beam splitting is used in the embodiment of the invention shown in FIG. 1, this can be avoided by adopting the alternative system shown in FIGS. 6 and 7. The areas viewed by the background detectors need not overlap if electrical circuitry is provided for producing the same effect as is produced by the overlapping background detectors of FIG. 1. Accordingly, only a single beam splitting device is used.

FIG. 6 shows a photodiode array 154 which includes photodiodes 156, 158, 160, 162 and 164 and eleven others all arranged in a row. Background detectors 166, 168, 170, 172 and 174 view rectangular background areas in the vicinity of and surrounding the areas viewed by the photodiodes in array 154.

The object of the circuitry shown in FIG. 7 is to combine the outputs of background detectors 166 and 168 so that they provide a background signal for comparison with the outputs of photodiodes 156, 158, 160 and 162, and to combine the outputs of each adjacent pair of background detectors to provide background signals for other groups of four photodiodes in array 154.

FIG. 7 shows background detectors 166, 168, 170 and 172 each having its cathode connected to a positive line 175. The anode of photodiode 166 is connected to the input of amplifier 176, the output of which is connected through resistor 178 to inverting input 180 of amplifier 182.

The non-inverting input of amplifier 182 is connected through resistor 188 to ground. A resistor 190 is connected between output terminal 192 and input 180.

Photodiode 168 is similarly connected through amplifier 194 and resistor 196 to input terminal 180.

The circuitry just described is in effect a summation network whereby the backgrounds detected by photodiodes 166 and 168 are added together to provide a resultant background signal at terminal 192, for comparison with the outputs of each of photodiodes 156, 158, 160 and 162. The comparison means, although not shown in FIG. 7, is similar to that in FIG. 3, wherein amplifier 182 of FIG. 7 would take the place of amplifier 90 in FIG. 3, terminal 192 would be connected to line 92, and photodiodes 156 through 162 (FIG.) 6) would take the place of photodiodes 51 through 54.

Returning to FIG. 7, it will be seen that the backgrounds detected by photodiodes 168 and 170 are combined to produce a composite signal at output terminal 198 of amplifier 200. Likewise, the backgrounds detected by photodiodes 170 and 172 are combined to product a composite signal at output 202 of amplifier 204. The remaining circuitry, although not shown, is similar, and provides for the combination of the signals from adjacent pairs of background detectors. Thus, with five background detectors viewing non-overlapping background areas, four background signals would be produced for the 16 photodiodes in area 154, or one background signal for every four photodiodes.

Figure 8:
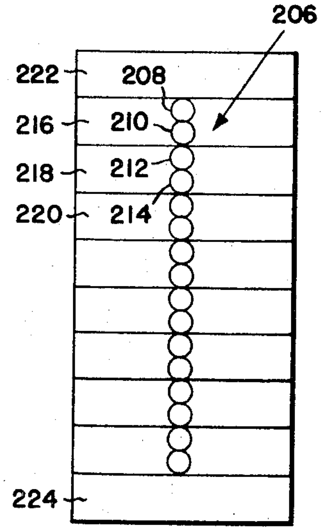
FIG. 8 is a diagram, similar to FIG. 2, showing another alternative array of photodiodes and background detectors in accordance with the invention.

An additional variation in the array combination is shown in FIG. 8 which includes a photodiode array 206 comprising a row of 16 photodiodes including photodiodes 208, 210, 212, and 214. The height of each background detector is twice the height of the area viewed by each photodiode in the array. The width of each background detector is approximately eight times the width of the area viewed by the photodiodes in the array. Background detector 216 is symmetrical with respect to the pair of photodiodes 208 and 210. Background detector 218 is symmetrical with respect to the pair of photodiodes 212 and 214. Background detector 220 is symmetrical with the next pair of photodiodes and so on.

Each pair of photodiodes is provided with a background detector symmetrical therewith. In addition, at the ends of the array there are provided background detectors 222 and 224.

Figure 9:
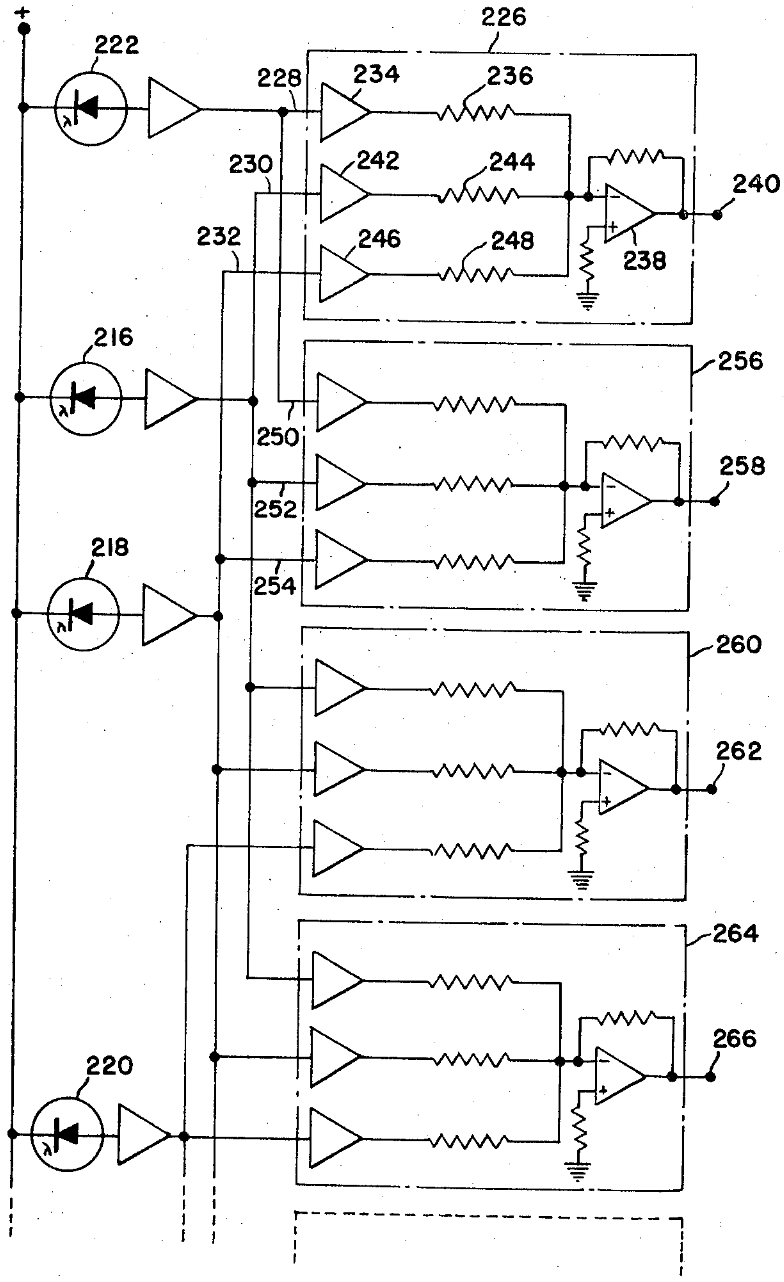
FIG. 9 is a schematic diagram of a summation network for use in conjunction with the scanning apparatus corresponding to FIG. 8.

FIG. 9 shows, in part, the circuitry employed in the operation of the scanning system utilizing the array combination depicted in FIG. 8.

A summation or averaging circuit 226 receives three inputs through lines 228, 230 and 232 respectively from photodiodes 222, 216, and 218. The input at 228 is amplified by amplifier 234 and is connected through a resistor 236 to the inverting input of amplifier 238, having its output at 240. The input at 230 is similarly amplified by amplifier 242 and connected through a resistor 244 to the inverting input of amplifier 238. The input at 232 is likewise amplified by amplifier 246 and connected through resistor 248 to the inverting input of amplifier 238.

The summation circuit 226 provides at output 240 a signal which represents a weighted average of its inputs. The weighting depends on the values of resistors 236, 244 and 248. Output 240 is the output to be compared with the output of photodiode 208. Since photodiode 208 is within the background viewed by detector 216, the most weight should be given to that area of the background. Since photodiode 208 is nearer background detector 222 than background detector 218, more weight should be given to the background viewed by detector 222 than to the background viewed by detector 218. This weighting is accomplished by using a low value for resistor 244, a higher value for resistor 236 and a still higher value for resistor 248.

The outputs of photodiodes 222, 216 and 218 are similarly connected to the three inputs 250, 252 and 254 of summation network 256, having an output 258 which carries a signal for comparison with the output of photodiode 210 in the scanning array. Summation network 256 is similar to network 226. However, the values of the weighting resistors are chosen so that, while the greatest weight is given to the background viewed by background detector 216, more weight is given to the background viewed by detector 218 than to the background viewed by detector 222. The reason for this, of course, is the proximity of the area viewed by photodiode 210 to the area viewed by background detector 218.

A third summation network 260 receives its three inputs from background detectors 216, 218 and 220. Its output 262 carries a signal for comparison with the output of photodiode 212. The weighting circuitry in summation circuit 260 gives the greatest weight to background detector 218, less weight to background detector 216, and the least weight to background detector 220.

The outputs of photodiodes 216, 218 and 220 are also delivered to the inputs of summation circuit 264. Summation circuit 264 has an output 266 which carries a signal for comparison with the output of photodiode 214. The weighting circuitry in summation network 264 gives the greatest weight to background detector 218, less weight to background detector 220, and still less weight to background detector 216.

The interconnections of the remaining background detectors and summation networks will be obvious from FIG. 9. For each combination of three adjacent background detectors, there are provided two summation networks, each summation network providing an output for comparison with the output of a photodiode in the scanning array 206. Comparison may be made by means of differential amplifiers similar to differential amplifiers 78, 80, 82, and 84 shown in FIG. 3.

The modification just described with reference to FIGS. 8 and 9 has the same advantage as the modification of FIGS. 6 and 7 in obviating the double beam splitter and the optical complexities associated with it. However, it provides a better approach to the results theoretically obtainable by a system having the same number of background detectors as photodiodes in the scanning array.

As mentioned previously, the signal processing system in accordance with the invention may fail to operate satisfactorily if the characters being scanned have comparatively large dark areas. If these dark areas are so large as to cover nearly the entire area viewed by a group of background detectors used to provide the background signal for a given photodiode in the scanning array, the apparatus could interpret what is being viewed as a very dark background when in fact it is merely part of a normal character which is being scanned. The result could be a reduction of the base line level to such an extent that the pulse corresponding to a character stroke fails to reach the quantizing level. Where this problem is likely to arise, the signal processing circuitry of the kind shown in FIG. 9 may be modified so that the background signal which is produced for comparison with the output of a photodiode in the scanning array follows the brightest of the several background areas being viewed more closely than the other background areas.

Figure 10:
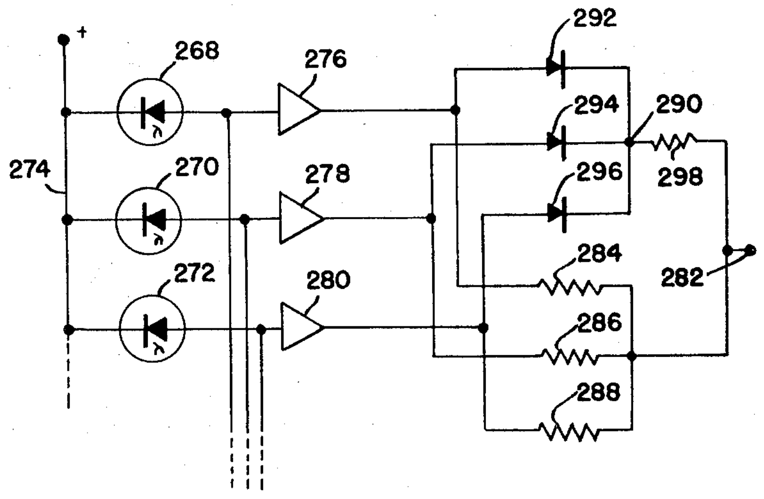
FIG. 10 is a schematic diagram of the network for the summation of average and brightest signals in accordance with the invention.

FIG. 10 shows a circuit capable of accomplishing this result which can be substituted for the circuitry providing the input to amplifier 238 in FIG. 9. In FIG. 10, photodiodes 268, 270 and 272 are three background detectors. Their cathodes are connected to positive line 274, and their anodes are respectively connected to the inputs of amplifiers 276, 278 and 280. The outputs of these amplifiers are respectively connected to output terminal 282 through resistors 284, 286 and 288. These resistors constitute a summation network similar to what is shown in FIG. 9, and may be of different values for the purpose of "weighting" in order to produce the appropriate signal level at output terminal 282 for the particular photodiode of the scanning array with which it is associated. In addition, the outputs of amplifiers 276, 278 and 280 are connected to junction 290 through diodes 292, 294 and 296. Junction 290 is connected to output terminal 282 through resistor 298.

The signal level at junction 290 corresponds to the brightest of the three background areas viewed by photodiodes 268, 270 and 272 because the diode of the group of diodes 292, 294 and 296 which has the highest positive level at its anode conducts, and the other two diodes are back-biased. At output terminal 282, the weighted signal is combined with the signal at junction 290 to produce a composite signal which behaves much like the signal at the inverting input of amplifier 238 (FIG. 9) except that it is less likely to fall to a level corresponding to a dark background merely as a result of an extraordinarily thick character stroke. So long as the thick character stroke does not cover all three of the background areas in the group, the background area which is brightest will be given emphasis in the output signal at terminal 282, and the signal will correspond more closely to the true background level.

We claim:

1. An optical scanner and signal processing system comprising:

scanning means comprising a first group of light-sensitive elements each adapted to sense the intensity of light impinging on it and to provide an output corresponding to the instantaneous value of said intensity and optical projecting means for projecting an image from a pattern-bearing medium onto said elements whereby the apertures of said elements reflected back onto the medium are aligned in a row to define a narrow elongated scanning area;

background detecting means comprising a second group of light-sensitive elements different from and fewer in number than the elements in the first group, said optical projecting means also and simultaneously projecting an image from the pattern-bearing medium onto the second group of elements whereby the apertures of the elements in the second group reflected back onto the medium are aligned in a row to define an elongated background area which surrounds the scanning area, said background detecting means providing a plurality of outputs, each corresponding to the instantaneous brightness of an area on said medium surrounding the area viewed by an element of the scanning means;

means for causing said images to traverse the apertures of the scanning and background detecting means; and means for subtracting the output of each light-sensitive element of the scanning means from the background detecting means output corresponding thereto and producing a response when the difference between the outputs exceeds a predetermined limit.

2. An optical scanner and signal processing system according to claim 1 in which each light-sensitive element of the background detecting means provides a plurality of outputs and in which the subtracting means subtracts an output of the scanning means from each of said plurality of outputs.

3. An optical scanner and signal processing system according to claim 1 in which the background detecting means includes means for averaging the outputs of plurality of elements in the second group to provide an output from which an output of the scanning means is subtracted.

4. An optical scanner and signal processing system according to claim 1 in which the background detecting means includes first means for averaging the outputs of a plurality of elements in the second group to provide a first output from which an output of the scanning means is subtracted, and second means for averaging the outputs of the same plurality of elements to provide a second output from which another output of the scanning means is subtracted.

5. An optical scanner and signal processing system according to claim 1 in which the background detecting means comprises first averaging means receiving signals from a first plurality of elements of the second group and providing one of the plurality of outputs of the background detecting means and second averaging means receiving a plurality of signals from a second plurality of elements of the second group and providing another one of said plurality of outputs, the first plurality being different as a whole from the second plurality but having at least one element in common with the second plurality.

6. An optical scanner and signal processing system according to claim 1 in which said background detecting means includes means for averaging the outputs of a plurality of elements in the second group to provide an output from which an output of the scanning means is subtracted, and in which said averaging means includes means producing a weighted average with emphasis on certain elements of said plurality of elements.

7. An optical scanner and signal processing system according to claim 1 in which said background detecting means includes means for averaging the outputs of a plurality of elements of the second group to provide an output from which an output of the scanning means is subtracted, and in which said averaging means includes means producing a weighted average with emphasis on the element of the plurality of elements which receives the most light.

8. An optical scanner and signal processing system according to claim 1 in which said background detecting means includes means for averaging the outputs of a plurality of elements of the second group to provide an output from which an output of the scanning means is subtracted, and in which said averaging means includes means providing a first signal corresponding to an average of the outputs of the elements in said plurality, means providing a second signal corresponding to the output of the element in said plurality which receives the most light, and means averaging said first and second signals to provide an output from which an output of an element of the scanning means is subtracted.

* * * * *